United States Patent [19]
Kerfoot, III et al.

[11] Patent Number: 6,038,356
[45] Date of Patent: Mar. 14, 2000

[54] LIGHTWAVE TRANSMISSION SYSTEM EMPLOYING RAMAN AND RARE-EARTH DOPED FIBER AMPLIFICATION

[75] Inventors: Franklin W. Kerfoot, III, Red Bank; Morten Nissov, Holmdel, both of N.J.

[73] Assignee: Tyco Submarine Systems Ltd., Morristown, N.J.

[21] Appl. No.: 08/937,896

[22] Filed: Sep. 25, 1997

[51] Int. Cl.⁷ ..................................................... G02B 6/28
[52] U.S. Cl. .............................. 385/24; 359/161; 359/173
[58] Field of Search ................................ 385/24; 359/154, 359/161, 173

[56] References Cited

U.S. PATENT DOCUMENTS

| | | | |
|---|---|---|---|
| 5,905,825 | 5/1999 | Brindel et al. | 385/24 |
| 5,943,147 | 8/1999 | Vanoli et al. | 359/110 |
| 5,946,117 | 8/1999 | Meli et al. | 359/124 |

*Primary Examiner*—Hung N. Ngo
*Attorney, Agent, or Firm*—Brian K. Dinicola

[57] ABSTRACT

A method is provided for transmitting an optical signal in an optical communication system. The system includes a transmitter for generating the optical signal, a receiver for detecting the signal, and an optical fiber communication link interposed between the transmitter and receiver. The optical fiber communication link includes transmission optical fibers concatenated with a plurality of Raman amplifiers and at least one rare earth doped optical fiber amplifier. The method includes the steps of: amplifying the optical signal as it advances through each of the plurality of Raman amplifiers; and compensating for variations in transmission path losses to restore the optical signal to a nominal power level as it advances through the rare earth doped optical fiber amplifier by maintaining the doped optical fiber amplifier in its saturated state.

5 Claims, 1 Drawing Sheet

LIGHTWAVE TRANSMISSION SYSTEM EMPLOYING RAMAN AND RARE-EARTH DOPED FIBER AMPLIFICATION

TECHNICAL FIELD

This invention relates to the optical transmission of information, and more particularly, to a lightwave transmission system employing Raman and rare earth doped amplification.

BACKGROUND OF THE INVENTION

Lightwave communication systems use optical amplifiers to carry large amounts of multiplexed data over long distances from a transmit terminal to a receive terminal. The maximum distance that the data can be transmitted in the fiber without amplification or regeneration is limited by, among other things, loss associated with the optical fiber. To transmit optical signals over long distances, the lightwave systems may include a number of optical amplifiers periodically located along the fiber route from the transmit terminal to the receive terminal. Each optical amplifier boosts the received signal to compensate for transmission losses which occurred since the last repeater. Optical amplifiers are attractive alternatives to other amplifier forms because they amplify lightwave signals in their optical form without conversion into a corresponding electrical signal. Each such optical amplifier is pumped, either optically or electrically, to provide signal amplification.

One optical amplifier realization that is commonly employed in lightwave communication systems is rare-earth doped optical fiber amplifiers. One desirable feature of such amplifiers is the automatic gain control they provide when operating in saturation. However, one disadvantage of such amplifiers is that they yield undesirably high noise levels. In contrast, a Raman amplifier, which is another optical amplifier realization, offers potentially lower noise levels but does not easily provide the gain control.

Doped fiber amplifiers that are pumped by a remotely located optical pump source via the transmission path are known. In such systems Raman amplification also occurs as the pump energy traverses the transmission path. However, remotely pumped systems are used in short-haul, unrepeatered lightwave transmission systems and hence automatic gain control in the amplifiers is not a concern. Accordingly, such systems do not take advantage of the full benefits offered by doped optical amplifiers operating in saturation.

It would therefore be desirable to provide a lightwave communications system which combines the automatic gain control characteristics of doped fiber amplifiers with the low noise characteristics of Raman amplifiers.

SUMMARY OF THE INVENTION

In accordance with the present invention, a method is provided for transmitting an optical signal in an optical communication system. The system includes a transmitter for generating the optical signal, a receiver for detecting the signal, and an optical fiber communication link interposed between the transmitter and receiver. The optical fiber communication link includes transmission optical fibers concatenated with a plurality of Raman amplifiers and at least one rare earth doped optical fiber amplifier. The method includes the steps of: amplifying the optical signal as it advances through each of the plurality of Raman amplifiers; and compensating for variations in transmission path losses to restore the optical signal to a nominal power level as it advances through the rare earth doped optical fiber amplifier by maintaining the doped optical fiber amplifier in its saturated state. As a result, the present invention utilizes the benefits of both Raman amplifiers and doped fiber amplifiers since the Raman amplifiers impart gain (and hence low noise) while the doped fiber amplifiers provide power stability.

DETAILED DESCRIPTION

Long distance lightwave communication systems require amplifiers for boosting optical signal levels sufficiently to compensate for losses experienced along the fiber transmission medium. Two classes of amplifiers are known, namely, lumped amplifiers and distributed amplifiers. An exemplary lumped amplifier is the rare earth doped fiber amplifier, which offers substantial benefits because of its simplicity, low cost, and connective compatibility with existing optical fibers. For an exemplary locally pumped, rare-earth doped, fiber amplifier, see Electron. Lett., Vol. 23, No. 19, pp. 1026 et seq. (1987). These amplifiers linearly increase optical signal power of a supplied input signal via stimulated emission of fiber dopants such as erbium that is subject to an optical pump source.

Figure 1:
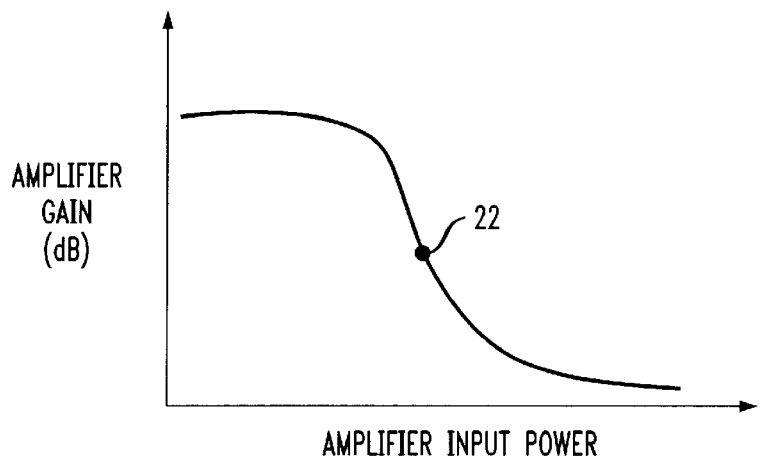
FIG. 1 shows the gain characteristics of a rare earth doped optical fiber amplifier.

Doped fiber amplifiers are also advantageous in communication systems when operating in a state of saturation because of the power stability they offer. In saturation, the amplifiers regulate the optical power of the signals propagating through the transmission path. A series of fiber amplifiers compensates for system degradations through a process of automatic gain adjustment. The characteristics of doped fiber amplifiers is shown in FIG. 1. The figure shows the small signal gain as a function of input signal power. For an operating point in the saturation region, such as point 22, amplifier gain increases if the average amplifier input power decreases. Likewise, the gain decreases if the average amplifier input power increases. Thus, the gain of optical amplifiers operating in saturation self-adjusts to variations in input power.

One drawback in using a concatenated series of doped fiber amplifiers extending along a transmission path is that the total noise at the remote terminal increases as the spacing between amplifiers increases. Moreover, the noise figure for practically realizable doped fiber amplifiers significantly exceeds the theoretical optimum value.

Distributed amplifiers include Raman amplifiers in which amplification is based on stimulated Raman scattering. Raman gain is generated by direct optical pumping of the transmission fiber and hence such amplifiers provide distributed amplification over an extended portion of the transmission path, often on a substantially uniform basis. An advantage of Raman amplifiers over doped fiber amplifiers is that practically realizable Raman amplifiers are capable of achieving actual noise figures closer to the theoretical optimum value. However, one limitation of Raman amplifiers is that they incur significant system penalties when operating in a state of saturation and thus cannot easily provide the power stability of doped fiber amplifiers. This factor, among others, has limited the applicability of Raman amplifiers in very long distance optical communication systems such as undersea communication systems.

In accordance with the present invention, an optical transmission system such as a long-haul undersea communication system is provided which utilizes both Raman amplification and doped fiber amplification. More specifically, Raman amplification is employed as the gain mechanism that compensates for losses in the transmission path while the doped fiber amplifiers are primarily employed not to impart gain, but to provide stabilization of the signal power. That is, the present invention utilizes the benefits of both Raman and doped fiber amplification while avoiding the deficiencies inherent in each process individually. The resulting transmission system achieves a lower level of total noise (through the use of Raman amplification as the gain mechanism) with adequate power stability (through the use of the doped fiber amplifiers operating in saturation).

While in some embodiments of the present invention the gain provided by the doped fiber amplifiers is substantially equal to zero, in other embodiments the doped fiber amplifiers impart nonzero gain that is used to compensate for losses in additional system components such as optical filters used to flatten the end to end system gain as a function of wavelength. In other embodiments of the invention, the power evolution is actively controlled by measuring the signal power at each point where Raman pumping is supplied and using a feedback loop to control the pump power so that the desired signal power level is attained. Accordingly, in this embodiment the doped fiber amplifiers are not required. This arrangement would be particularly useful when pumping is performed in the counterpropagating direction (i.e., when the pump power travels in a direction opposite to the signal). Alternatively, such active power control elements could be located at intervals less frequent than every pump site. For example, the active power control elements could be incorporated into certain repeater bottles which house the Raman pumps in long haul systems. The repeaters incorporating the active power control elements may then be spaced at intervals of every five to standard ten repeaters (i.e., those not using the active power control elements).

Figure 2:
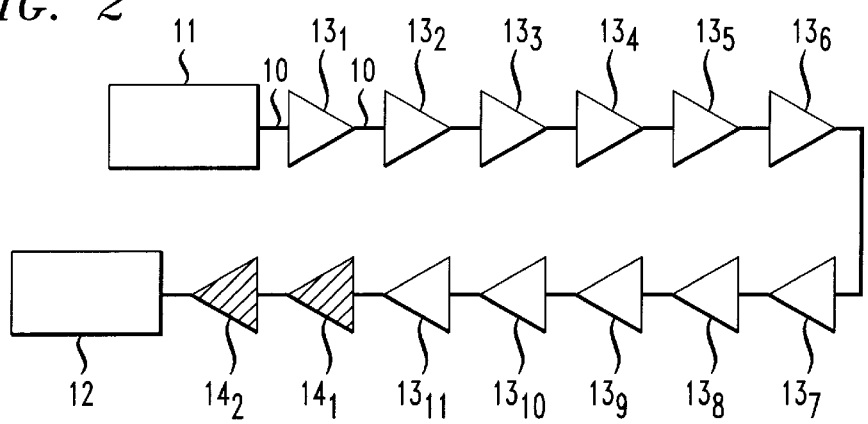
FIG. 2 shows an exemplary optical communication system operating in accordance with the present invention.

An exemplary optical communications system that was employed to demonstrate the features of the present invention is shown in FIG. 2, wherein 10 is an optical fiber transmission path, 11 is a transmitter of an optical signal, 12 is a receiver for detecting the optical signal, $13_1, 13_2, \ldots 13_{11}$ are Raman amplifiers disposed along the optical fiber path 10, and $14_1$ and $14_2$ are erbium doped fiber amplifiers (EDFAs) located in the transmission path between Raman amplifier $13_{11}$ and the receiver 12. Such well-known parts of a communications system as drive electronics, detector electronics, splices attenuators, couplers, etc, are considered to be conventional and have been omitted from the figure.

Figure 3:
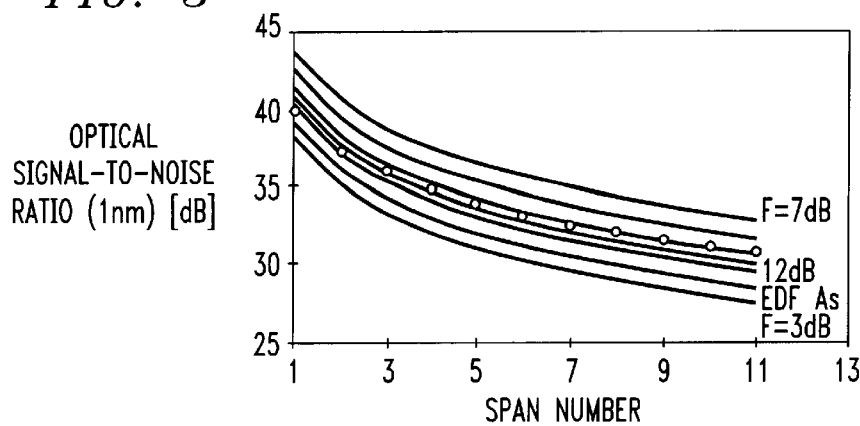
FIG. 3 shows the signal to noise evolution of a probe signal traversing the system shown in FIG. 2.

The eleven spans or portions of the transmission path between the amplifiers extended 514 km in length. Spans 1–5 and 7–11 comprised 45 km sections of dispersion shifted fiber (−2.6 ps/km-nm average dispersion). The system was operated in a circulating loop fashion with a total path length of 7,000 km. In operation, the pump source was a cascaded Raman laser operating at 1452 nm with a power of 235–308 nW. Raman amplifier $13_6$, which provided dispersion compensation, was based on 62 km conventional single mode fiber (+17 ps/km-nm), requiring a pump power of 630 nW. EDFAs 141 and 142 provided both power level control and additional gain. The total launch power of all ten channels was 2.6 dBm and the corresponding path averaged power was 1.4 dBm. FIG. 3 shows the signal to noise (SNR) evolution of a 1.8 dBM, 1550 nm probe signal traversing the 514 km amplifier chain. The lines are calculation based on linear noise theory for concatenated amplifiers and open squares are measurements from the transmission system. The figure illustrates that the performance of the amplifiers asymptotically approached the performance of a chain of Raman amplifiers with a 9 dB noise figure for each individual amplifier. Line 40 shows the performance of ideal series of EDFAs with 3 dB noise figures spaced 45 km apart. The optical SNR of the Raman chain of amplifiers is 3.5 dB better than that of the EDFA chain, assuming equal launch powers. This translates to a 1.5 dB improvement in performance, assuming equal path-averaged power.

The invention claimed is:

1. A method for transmitting an optical signal in an optical communication system having a transmitter for generating the optical signal, a receiver for detecting said signal, and an optical fiber communication link interposed between said transmitter and said receiver, said optical fiber communication link having transmission optical fibers concatenated with a plurality of Raman amplifiers and at least one rare earth doped optical fiber amplifier, the method comprising the steps of:

amplifying the optical signal as it advances through each of said plurality of Raman amplifiers;

compensating for variations in transmission path losses to restore the optical signal to a nominal power level as it advances through said at least one rare earth doped optical fiber amplifier by maintaining said at least one rare earth doped optical fiber amplifier in its saturated state.

2. The method of claim 1 wherein said at least one rare earth doped optical fiber comprises a plurality of concatenated rare earth doped optical fibers operating in states of saturation.

3. A method for transmitting an optical signal in an optical communication system having a transmitter for generating the optical signal, a receiver for detecting said signal, and an optical fiber communication link interposed between said transmitter and said receiver, said optical fiber communication link having transmission optical fibers concatenated with a plurality of Raman amplifiers and at least one rare earth doped optical fiber amplifier, the method comprising the steps of:

amplifying the optical signal as it advances through each of said plurality of Raman amplifiers;

compensating for variations in transmission path losses to restore the optical signal to a nominal power level by measuring the optical signal power at points along said communication link where Raman pumping power is supplied and adjusting said Raman pump power in response to said measured optical signal power to provide active gain control.

4. An optical communication system, comprising:

a transmitter for generating the optical signal;

a receiver for detecting said signal;

an optical fiber communication link interposed between said transmitter and said receiver, said optical fiber communication link having transmission optical fibers concatenated with a plurality of Raman amplifiers and at least one rare earth doped optical fiber amplifier, wherein said amplifiers are adapted to perform the steps of:

amplifying the optical signal as it advances through each of said plurality of Raman amplifiers;

compensating for variations in transmission path losses to restore the optical signal to a nominal power level as it advances through said at least one rare earth doped optical fiber amplifier by maintaining said at least one rare earth doped optical fiber amplifier in its saturated state.

5. An optical communication system, comprising:

a transmitter for generating the optical signal;

a receiver for detecting said signal;

an optical fiber communication link interposed between said transmitter and said receiver, said optical fiber communication link having transmission optical fibers concatenated with a plurality of Raman amplifiers and at least one rare earth doped optical fiber amplifier, wherein said amplifiers are adapted to perform the steps of:

amplifying the optical signal as it advances through each of said plurality of Raman amplifiers;

compensating for variations in transmission path losses to restore the optical signal to a nominal power level by measuring the optical signal power at points along said communication link where Raman pumping power is supplied and adjusting said Raman pump power in response to said measured optical signal power to provide active gain control.

* * * * *